(12) United States Patent
Chechuy (10) Patent No.: US 10,796,352 B2
(45) Date of Patent: Oct. 6, 2020

(54) SYSTEM AND METHOD FOR MANAGING PRODUCT CATALOGS

(71) Applicant: CBS INTERACTIVE INC., San Francisco, CA (US)

(72) Inventor: Dmitry Chechuy, San Francisco, CA (US)

(73) Assignee: CBS Interactive Inc., San Francisco, CA (US)

(*) Notice: Subject to any disclaimer, the term of this patent is extended or adjusted under 35 U.S.C. 154(b) by 75 days.

(21) Appl. No.: 16/236,767

(22) Filed: Dec. 31, 2018

(65) Prior Publication Data

US 2019/0139110 A1     May 9, 2019

Related U.S. Application Data

(62) Division of application No. 13/651,955, filed on Oct. 15, 2012, now Pat. No. 10,210,553.

(51) Int. Cl.
*G06Q 30/00* (2012.01)
*G06Q 30/06* (2012.01)

(52) U.S. Cl.
CPC ................. *G06Q 30/0603* (2013.01)

(58) Field of Classification Search
CPC .................................................. G06Q 30/0603
See application file for complete search history.

(56) References Cited

U.S. PATENT DOCUMENTS

| | | | |
|---|---|---|---|
| 8,655,737 B1* | 2/2014 | Tromble | G06Q 30/00 705/1.1 |
| 2009/0222425 A1* | 9/2009 | Chen | G06F 16/9038 |

OTHER PUBLICATIONS

Farber, D. A., & Lachman, R. D. (1999). Data processing system using substantially unique identifiers to identify data items, whereby identical data items have the same identifiers Retrieved from https://search.proquest.com/docview/30645056?accountid=14753.*

* cited by examiner

*Primary Examiner* — Kathleen Palavecino
(74) *Attorney, Agent, or Firm* — Rimon PC; Marc Kaufman (57) ABSTRACT

Product listings from a product catalog are organized by implementing programmatic processes that de-duplicate, cluster and/or group product listings.

11 Claims, 5 Drawing Sheets

SYSTEM AND METHOD FOR MANAGING PRODUCT CATALOGS

RELATED APPLICATIONS

The present application is a Divisional of Ser. No. 13/651,955 filed on Oct. 15, 2012 and titled SYSTEM AND METHOD FOR MANAGING PRODUCT CATALOGS, the content being expressly incorporated herein in its entirety.

TECHNICAL FIELD

Embodiments described herein relate generally to a system and method for managing product catalogs.

BACKGROUND

Online commerce sites often utilize online product catalogs that list products from numerous manufacturers and providers. The online catalogs typically include product listings for individual products. The product listings can include, for example, a specification sheet which lists manufacturer provided information, including manufacturer part number, product specification, and searchable attributes for the product.

DETAILED DESCRIPTION

Embodiments described herein include a system and method to manage and organize a product catalog. Among other benefits, embodiments described herein enable for reduction in duplication and redundancy amongst product listings of a product catalog. The reduction in duplication and redundancy can enable computation efficiency, as well as online marketing efficiency, For example, traffic for the resulting product listings can become more concentrated.

In some embodiments, a collection of product listings are analyzed from a product catalog. Each listing in the collection corresponds to a product, and each of the product listings of the collection provides (i) a product identifier, and (ii) a product description. A first set of product listings in the collection are grouped based on a determination that the first set of product listings is duplicative. A second set of product listings in the collection are clustered. The second set of product listings can have a common manufacturer and product name, but differ from one another based on a set of one or more key characteristics.

Still further, in some embodiments, product listings are clustered, in order to enable multiple product listings for similar products (e.g., from same manufacturer or source) to be presentable at one time (e.g., on a single web page). Such clustering or grouping further enhances the ability of, for example, online retailers to concentrate network traffic to products of interest.

According to some embodiments, product listings from a product catalog are organized by implementing programmatic processes that de-duplicate, cluster and/or group product listings.

In some embodiments, product listings are de-duplicated based on a programmatic determination (e.g., made through use of computing resources) that there are multiple product listings for a same product, and that the product listings have recorded product identifiers (e.g., MPN) that are different, but which should or could be considered to be the same. Accordingly, an embodiment provides for product listings to be grouped based on a determination that two or more product listings are identical, and that the two product listings should have the same product identifier. A discrepancy in the product identifiers of the two product listings can be analyzed to confirm that the product identifiers should be the same, albeit recorded with a discrepancy or dissimilarity in the product catalog.

As an addition or alternative, one or more embodiments identify product listings that are for a same product, and which include product identifiers (e.g., MPN) that are in fact different. One or more embodiments may group such product listings, and provide a single product listing that is representative of all of the product listings of the group.

As an addition or alternative, one or more embodiments identify product listings that are for similar products, such as for a product line that has variations of different products. According to embodiments, product listings can be clustered, so that such similar products are clustered together. The clustered product listings can be associated with key characteristics that distinguish the products from one another. Some or all of the product listings in an individual cluster can be displayed together, in order to enable, for example, an online retailer to consolidate traffic directed to the product line represented by the cluster of product listings.

Still further, some embodiments described herein provide for a system and method for managing a product catalog. According to one or more embodiments, a plurality of product listings from a product catalog are analyzed. Each of the plurality of product listings correspond to a product, and each of the plurality of product listings can provide (i) a product identifier, and (ii) a product description. A determination is made that a first set of two or more product listings in the product catalog are duplicative. A determination can also be made that a first set of two or more product listings in the product catalog are duplicative, in that each of the product listings of the first set are for a first product, and that a discrepancy between each of the product identifiers of the first set of two or more product listings is immaterial. The product catalog can be organized by (i) de-duplicating the first set of two or more product listings, and (ii) defining a cluster using the second set of product listing.

A product listing refers to a record, or associated set of elements, that provide description and identification for a particular product.

Numerous examples provided herein refer to a "manufacturer part number" or "MPN," which are examples of unique product identifiers. Other examples of unique product identifiers include Universal Product Code ("UPC"), International Standard Book Number ("ISBN"), European Article Number ("EAN") or Japanese Article Number ("JAN").

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
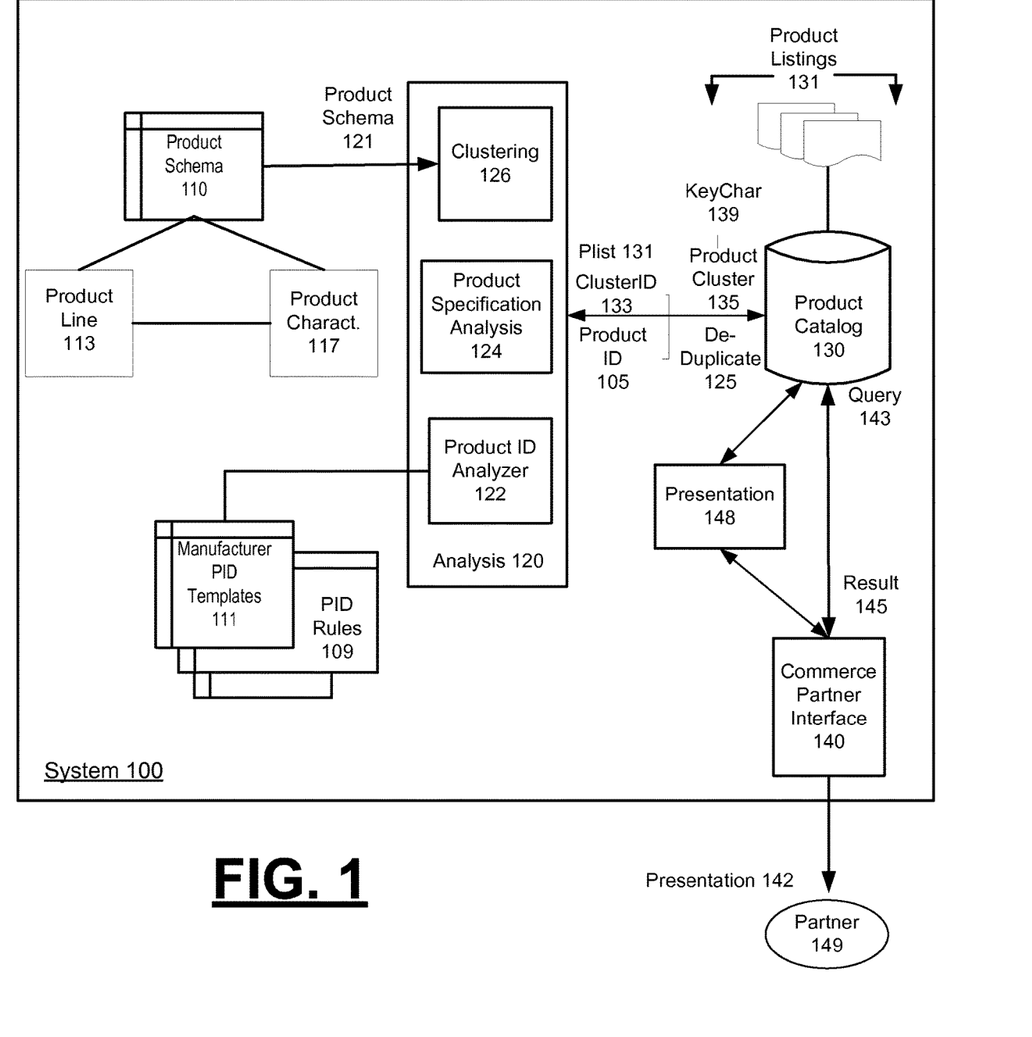
FIG. 1 illustrates a system for managing a product catalog, according to one or more embodiments.

FIG. 1 illustrates a system for managing a product catalog, according to one or more embodiments. A system 100 such as described by an example of FIG. 1, can be implemented in a variety of computing environments. For example, system 100 can be implemented as a network service that can be provided to cleanse product catalogs, such as used by online merchants and/or product commerce partners, of product listings that are duplicative or redundant. Accordingly, system 100 can be implemented as a network service, through a combination of servers or other network enabled computing devices. In variations, system 100 can be implemented on other computing platforms, including stand-alone systems. Thus, for example, system 100 can operate on a product catalog that is maintained on a single computing device or storage device.

Embodiments recognize that when a given product has multiple unnecessary product listings, negative consequences can result in how that product can be marketed, or made available to users. For example, multiple product listings can have a negative impact on the search engine optimization capabilities of the online retailer to offer a product, as the online traffic to the product listings can become distributed amongst multiple product pages. Thus, among other benefits, system 100 and other embodiments described herein enable product catalogs to be cleansed of duplicative or redundant product listings. Furthermore, embodiments enable the product catalogs to be augmented with additional information that enables online retailers and product content providers to group or cluster product listings that relate to a same product or product line.

In embodiments, system 100 includes an analysis module 120 that analyzes a product catalog 130. The product catalog 130 includes a collection of product listings 131. Each product listing 131 can identify a specific product, and include a unique product identifier (e.g., MPN), specification and descriptive text content, images and possibly video or media. For example, in the context of computer products, product listings 131 typically include product pages, including technical specification, manufacturer description, component list, performance characteristics, images, price and other content.

In some implementations, the product catalog 130 can be provided by a database or database system. The product listings 131 can be maintained as relational data elements that are stored in the database system. Among other benefits, the reduction in duplication and redundancy of the database provides the technical effect of enabling more efficient database operations. For example, the database 131 can respond to queries with responses that fewer product listings, resulting in faster operations that yield more relevant results to a user.

The product catalog 130 can be provided either as part of system 100, or separate from system 100. For example, system 100 can be implemented as a service for website operators who provide product listings and other content from the product catalog 130.

The analysis module 120 analyzes product listings 131 of the product catalog 130 in order to manage and organize the product catalog. According to embodiments, the analysis module 120 performs functions that include de-duplicating the product catalog 130, grouping product listings for substantially identical products (and then de-duplicating), and clustering product listings of similar products or products of a common product line.

The de-duplication process can include linking or consolidating product listings that can be considered duplicative, in that the product listings are identical, or substantially the same. In some implementation, the de-duplication process can include removing some product listings, or alternatively flagging some product listings for removal. Two or more product listings can be considered duplicative of one another if the product listings identify the identical product. For example, in many cases, product listings 131 are actual duplicates but contain some variation or error that results in the product listings 131 being separately identified. According to some embodiments, the analysis module 120 operates to determine when variations or discrepancies amongst the product identifiers of two or more product listings can be deemed immaterial. For example, a product listing can be a duplicate if the product listing describes a same product as another product listing in the product catalog, but includes a product identifier (e.g., MPN) that is slightly different than the other product listing. Such instances may arise when two product listings should have the same product identifier (e.g., MPN), but are listed in the product catalog 130 with different product identifiers (e.g., one product identifier has human error entry). Accordingly, the de-duplication process can be based in part on the analysis of product identifiers provided with the individual product listings 131 of the product catalog 130.

In one embodiment, a product identifier analysis component ("PID analyzer 122") can implement logic to determine when product listings 131 are duplicative. The PID analyzer 122 scans product listings (or product identifier information of product listings) to identify instances when, for example, two product listings have slightly different product identifiers. The occurrence of such discrepancies can identify situations where two product listings 131 should have a same product identifier, even though they are recorded in the product catalog as having different product identifiers. The PID analyzer 122 can also scans product listings 131 to determine whether product identifiers provided in the product listings have detectable errors, without necessarily comparing product listings. In this way, discrepancies amongst product identifiers can be determined to be immaterial, so as to enable the conclusion that the two product identifiers should or could be the same.

In analyzing the product identifiers provided with individual product listings 131, the PID analyzer 122 can utilize resources that include product ID templates 111. The product ID templates 111 can identify general format parameters of product identifiers (e.g., MPN) based on, for example, the product source (e.g., manufacturer) or convention. Thus, the product ID templates 111 can be specific to a particular manufacturer, retailer or product source. Additionally, each product ID template 111 can designate one or more parameters for a correctly stated product identifier. For example, a given product ID template 111 can specify the number of characters that are to appear in the product ID of a particular product source, or specific characters that are to appear in a particular portion of the product ID (e.g., "-" or "x"). Additionally, the product ID template 111 can be used to identify instances when, for example, (i) a product listing has too many or too few characters, and/or (ii) when portions of, for example, the MPN (e.g., the beginning) includes a wrong character or character class (e.g., number versus letter).

As an addition or variation, the PID analyzer 122 can also utilize product ID rules 109 for determining whether the product ID (e.g., MPN) is correctly stated, and/or whether the product listings should actually have the same product ID (e.g., one product listing misstates the MPN). As a specific example, the product ID rules 109 can specify characters that are not to appear in the product ID (e.g., "0" can appear, but "o") of a particular manufacturer, retailer or product source, so that if such character does appear, the PID analyzer 122 can flag an error.

The PID analyzer 122 can use the PID template 111 and/or the product ID rules 109 to process the product listings 131 to determine when two or more product listings are duplicative. For example, the PID analyzer 122 can mark individual product listings 131 as suspect if the product identifier provided in each of two product listings share a common set of characters (e.g., all characters but one), or if the only difference between the product identifiers of two product listings is the use of a special character that is flagged as having a high error rate (e.g., the letter 'o' versus the number '0'). The PID analyzer 122 can be used to analyze the product ID 105 of individual product listings in order to determine, for example, when a particular product listing should be removed from the product catalog 130. For example, the PID analyzer 122 can analyze the product ID 105 of the product listings 131 to determine that two product listings 131 are the same, even though the product ID 105 of the two product listings is slightly different. The PID analyzer 122 can, for example, identify an error in the characters of the identified product listings 131.

According to an embodiment, the analysis module 120 uses the PID analyzer 122 to identify or record when product listings 131 of the product catalog 130 are actual duplicates. The analysis module 120 can signal 125 product catalog 130 to group records that are deemed actual duplicates. Duplicate product listings 131 can be consolidated (e.g., grouped, with single representative product listing) and/or marked for elimination from the product catalog 130.

As an addition or variation, the analysis module 120 can use the PID analyzer 122 to scan product IDs 105 of individual product listings 131 to determine product IDs that are suspect as to error. Thus, PID analyzer 122 can scan the product IDs 105 of the product listings 131 to determine potential errors without comparing two product listings 131 or identifying duplicity amongst product IDs. Thus, rather than compare product listings for purpose of determining duplication, the analysis module 120 can use the PID analyzer 122 can auto-correct the product ID 105, or alternatively flag, the product ID for correction.

Additionally, product listings can be considered logically duplicative of one another if the product listing are for products that are identified as being different, but are the same when compared to one another. In some embodiments, the analysis module 120 processes product listings 131 from the product catalog 130 in order to group product listings 131 that have valid and distinct product identifiers, but which are for essentially the same product. For example, the products of two product listings may be include a same product name, brand, and share a common set of key characteristics for that product.

An embodiment recognizes that manufacturers and retailers can sometimes associate different product identifiers to identical or equivalent products. For example, a cell phone carrier can distribute a cell phone under one of multiple possible product identifiers. While no error may be present in the product identifiers of such product listings, embodiments recognize that the distribution of product listings for one product can have detrimental consequences as to the online marketing of the product from the product catalog 130. For example, if the audience for product listings of the given product are distributed to multiple product pages (each of which correspond to different product listing), then each of the product listings will suffer in terms of the ability of a search engine to identify the product pages when searches are performed for the particular product.

In an embodiment, the analysis module 120 includes a product content analysis component 124. The product content analysis 124 can process individual product listings 131 to facilitate the analysis module 120 in determining when the product listings are describing a same product (albeit with different product identifiers). In one embodiment, the product content analysis 124 performs comparative analysis as between multiple product listings 131 in order to identify instances when the product listings are for products that are logically equivalent. The comparative analysis can be based on, for example, the specification sheet or product description provided by a manufacturer of a product. Each specification sheet or product description can be scanned to determine if the respective contents of the product listings are the same. Metrics, such as word count, identical wording, and metadata or tags (e.g., searchable terms) can also be used to determine comparative scoring between two product listings. A threshold can be defined for when the comparative scores are deemed to identify two product listings that are identical. For example, the threshold can be determined from empirical results and/or machine learning.

The analysis module 120 can signal a group identifier ("group ID 133") to group individual product listings 131 of the product catalog 130 as being logically the same. Thus, for example, multiple product listings for a common product can be associated with a common group. The grouping of product listings 131 can be associated with a master product listing. The master product listing can be selected as being representative of all the product listings under the group ID 133 which are deemed to be logical duplicates.

Additionally, the grouping of product listings enables an online merchant or product content provider, for example, to create either (i) a single product listing that links to the multiple logically duplicative product listings, or (ii) a single product page for a group of identical or near-identical products. The single product page can unite the audience for the particular product, thus enhancing the marketability of the product from that merchant or product content provider. Likewise, the use of a single page for multiple product listings of a single product can enhance the search engine optimization parameters related to that product and product listing, thus enhancing the online marketing of the product.

Still further, the analysis module 120 can implement clustering of product listings 131 amongst products. Each product category can correspond to, for example, a product of a particular product line. The product listings for each cluster can include products that have different key characteristics. For example, a product of a product line can be provided with variations as to key characteristics such as price, performance attributes, color, and/or other features. As a specific example, a mobile computing device from a particular manufacturer or carrier can be offered with different levels of memory, color, augmentations, and other functionality. Likewise, a laptop of a particular product line and brand can be offered from a manufacturer with variations as to processor, memory, type of memory, communication capabilities, or form factor. Each variation to such product can have its own product identifier.

According to some embodiments, the analysis component 120 includes a clustering component 126 that statistically or quantitatively analyzes product listings 131 for a particular product line in order to determine (i) clusters of product ("product cluster 135"), and (ii) key characteristics 139 of the product line. The clusters can be defined to share some key characteristics and to be differentiated from other clusters based on other key characteristics. In one implementation, a distribution of product listings for a particular product line can identify statistical clusters which identify a set of characteristics. The statistical cluster distribution of product listings can be mapped to defined clusters which are then associated with the key characteristics that are shared by that product cluster. For example, for a particular product line, the number of product listings 131 can be graphed by individual characteristic, and variations in the number of product listings by characteristic can be used to identify a key characteristic 139 for the product line. In this way, statistical analysis can be used to identify key characteristics 139 for a particular product line (or range of products sharing a particular brand or source (e.g., operating system)).

As an addition or alternative, the distribution of product listings for the product line can be mapped to price points in order to identify characteristics of the product that are shared at key price points. Such statistical distribution can further delineate the clusters and their respective key characteristics.

In this way, the analysis module 120 utilizes the clustering component 126 to associate product listings 131 with product clusters 135. More specifically, individual product listings can be associated with a particular cluster 135 of products that are identical in brand, similar or identical in product name, but different in one or more differentiating attributes or key characteristics 139 that affect the marketing of the product. For example, a mobile computing device can be part of a cluster that identifies the manufacturer of the mobile computing device, as well as the product name of that device. But product listings 131 that comprise a given cluster represent products that have variations as to features such as color or memory size.

As an addition or alternative, the clustering component 126 may utilize a product schema input 121 that defines the elements for clustering product listings. The product schema input 121 can be based off of a product schema 110. The product schema 110 can specify product lines, as well as product characteristics of the product lines. The product line 113 can correspond to a set of products from a common source or manufacturer, or associated with a common brand or marketing name. The products of the product line 113 can be distinguished from one another based on certain characteristics 117. As an example, a product category 113 can correspond to a particular tablet line, under a brand name and provided from particular manufacturer. The tablet line can include multiple products, based on memory size, wireless communication capabilities, or color. Each of the products in the product line 113 can have its own product identifier (e.g., MPN). The product characteristic 117 that distinguishes products within the product line 113 can be identified in the product schema 110. Thus, for example, in the tablet example, the key product characteristics 117 can include multiple characteristics for memory size (e.g., 16 GB or 64 GB), as well as characteristics for color and/or wireless communication capabilities (e.g., with cellular communication capabilities, with 4G or not, etc.).

The clustering component 126 can use statistical or other quantitative analysis and/or the product schema input 121 in order to assign product listings to a particular product cluster 135. The association between product listings and product cluster can be maintained in the product catalog 130. When stored in the product catalog 130, embodiments enable online retailers and product commerce partners to create web pages or other unified presentations in which products are displayed to users by product category 113. The clustering of different products under one product category can enhance the user experience. For example, the product catalog 130 can correspond to a database that is queried by a partner component through the commerce partner interface 140. For example, the query 143 can identify a product cluster (e.g., query specifies a product name). In the response, the product catalog 130 can return a result 145, including a set of product listings for a particular product cluster. The set of product listings can be combined and displayed together (e.g., as one web page).

Figure 3:
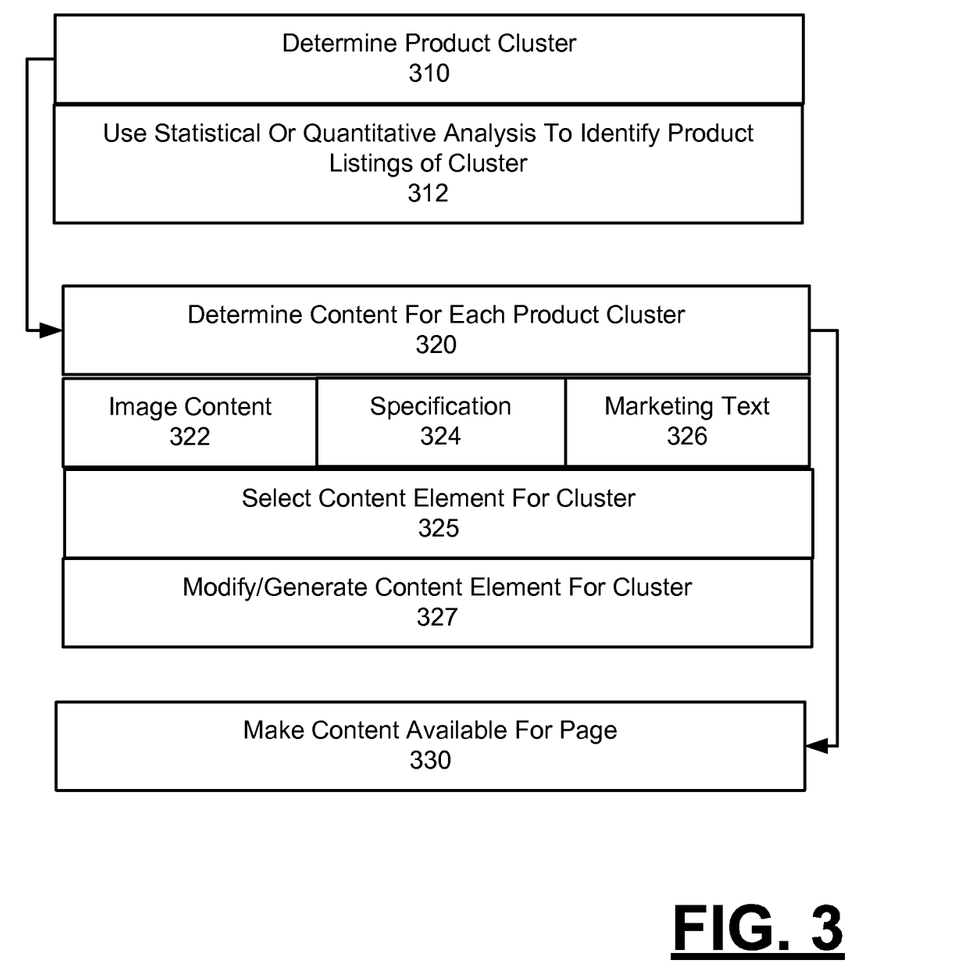
FIG. 3 illustrates a method for managing online product catalog to include information that enables product clustering, according to one or more embodiments.
Figure 4A:
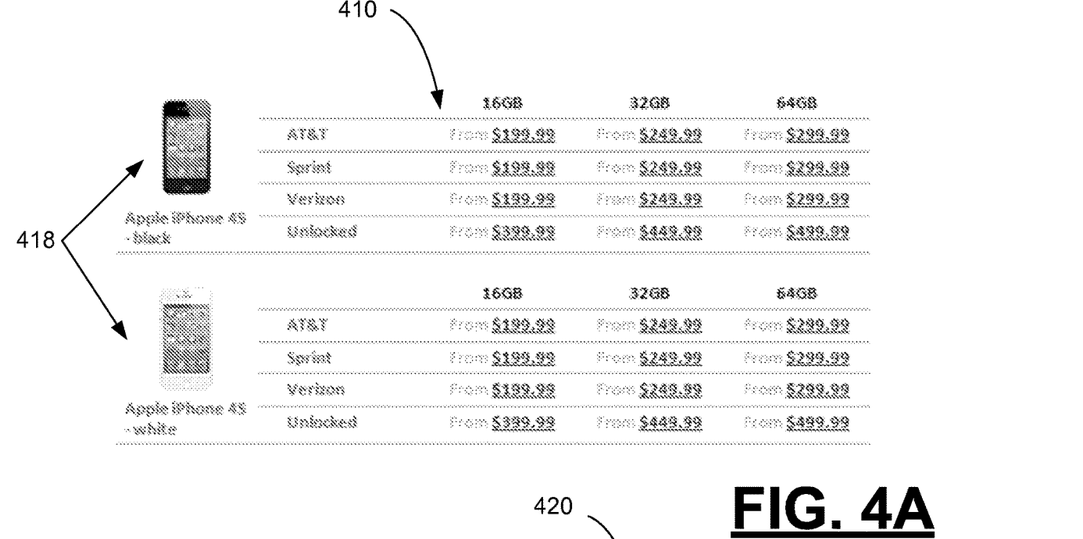
FIG. 4A and FIG. 4B illustrate examples of presentations that depict product content based on determined clusters of product listings, according to one or more embodiments.
Figure 4B:
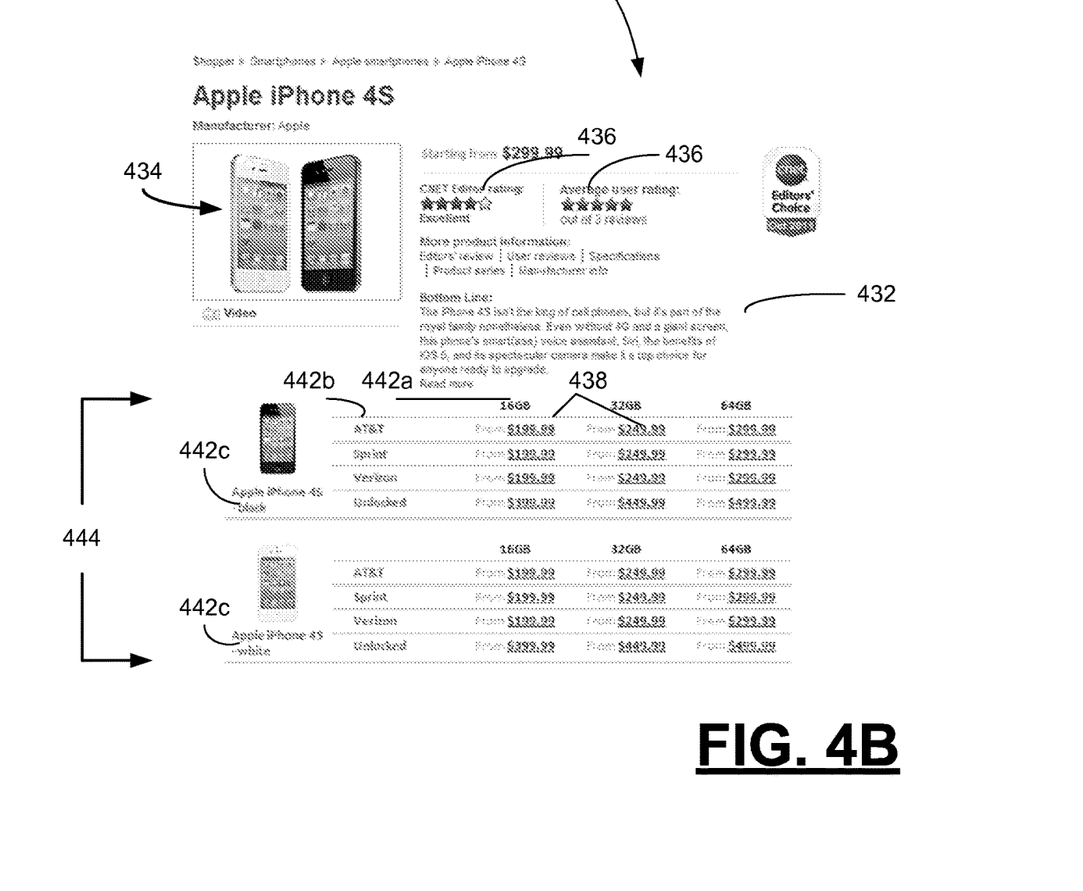

As described with an embodiment of FIG. 3 and FIG. 4A and FIG. 4B, some embodiments include a presentation component 148 that links various content elements of product listings 131 for individual clusters in a manner that allows for generation of a single consolidated product page for the particular cluster. In consolidating the content elements for product listings a product cluster, the presentation component 148 can implement processes to select representative images for the product of the product cluster, as well as marketing text, technical specification and other information. As an addition or alternative, the presentation component 148 can programmatically generate content, such as text (e.g., generate text to change key characteristic to characteristic range, such as "Blue" to "Blue, Red, White and Black," or "256 GB and 512 GB" to "256 or 512 GB"). The presentation component 148 can also configure images to select a single or small set of images that is representative of the cluster. In selecting content, rules sets may be used to identify which elements to select based on, for example, popularity amongst consumers, or number of product listings. The presentation component 148 can include a framework or template for generating a product page using select and/or modified product listings of a product cluster. In this way, the presentation component can generate a product page that provides information about a specific product, but the information for the product is representative of multiple product listings. This allows for the product page to have consolidated viewership and better search engine optimization.

In one embodiment, a commerce partner 149 can query 143 the product catalog 130 through the interface 140. In return, the product catalog 130 can return a result 145 that includes (i) only one representative or consolidated product listing (or master product listing) from the group, or (ii) a combined listing that includes content or aspects of multiple product listings in a cluster. The commerce partner 140 can thus generate a single presentation 142 that represents or includes a cluster of product listings. The cluster of product listings can be a consolidated listing that incorporates elements from multiple product listings in the group. For example, presentation 142 can correspond to a web page that provides a single product listing that is either designated as being representative of the product listings of the group, or consolidated to include elements from multiple product listings of the group. As another example, the presentation 142 can correspond to, for example, a web page that includes a combined cluster of product listing, in which elements or components from multiple product listings are provided. In this way, the commerce partner interface 140 can access information for providing a consolidated product listings for a common product, thus enhancing marketing of the product and its product listings.

When presentation 142 is provided as a product page, the user can choose and select a particular product from a web page that provides multiple products of a product category, without the user having to navigate to multiple different web pages. Furthermore, as explained with other embodiments, the unification of the different product listings 131 for a particular product category on, for example, a single presentation or webpage can enhance search engine optimization parameters.

Methodology

Figure 2:
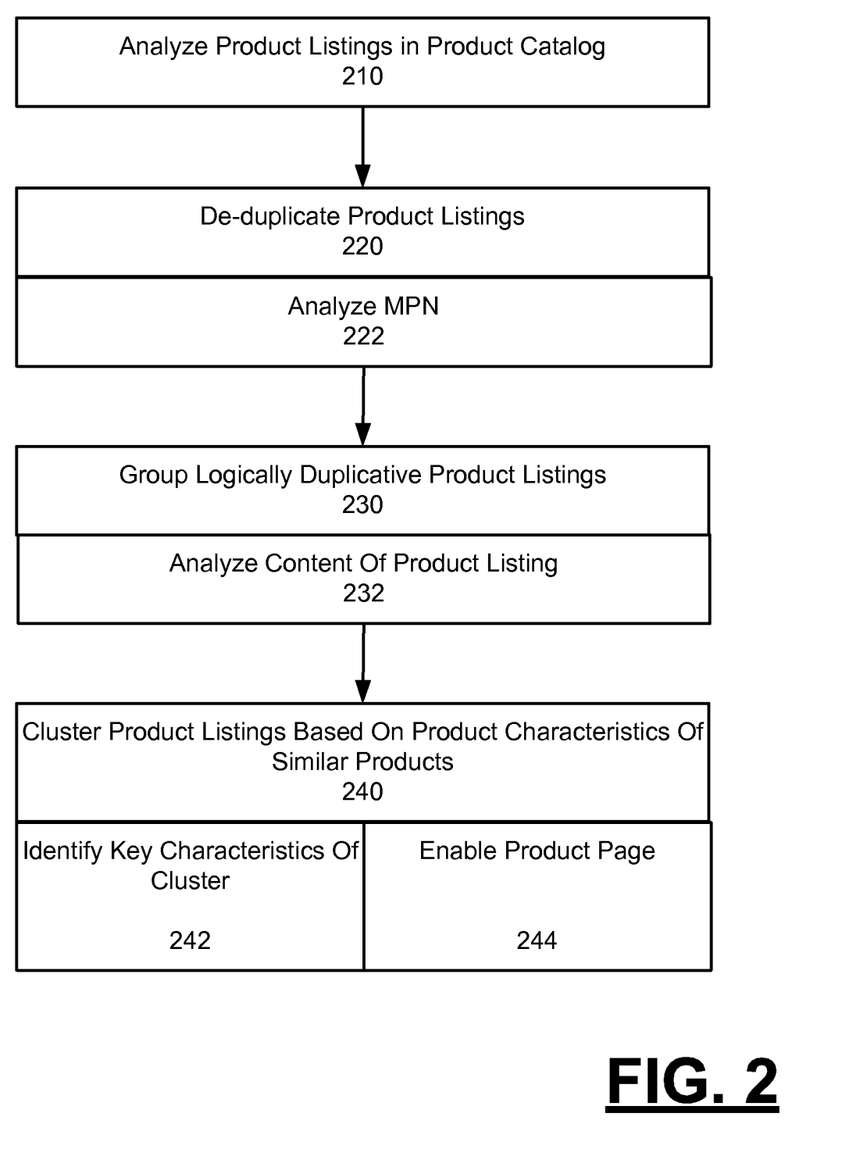
FIG. 2 illustrates a method for managing an online product catalog, according to an embodiment.

FIG. 2 illustrates a method for managing an online product catalog, according to an embodiment. FIG. 3 illustrates a method for managing online product catalog to include information that enables product clustering, according to one or more embodiments. Example methods such as described by FIG. 2 and FIG. 3 can be implemented using, for example, components or elements described with FIG. 1. Accordingly, reference may be made to elements of FIG. 1 for purpose of illustrating a suitable component for performing a step or sub step being described.

With reference to FIG. 2, the product listings of a product catalog can be programmatically analyzed (210). For example, analysis module 120 can retrieve or scan product listings 131. As mentioned, each product listing can include manufacture provided text about the particular product, metadata associated with the product, images, and other information. Additionally each product listing can include a product identifier, such as a manufacturer product number (MPN). The analysis of the individual product listings can include analyzing the product identifiers, the content of the product listings (e.g., text or images), and/or the metadata associated with the product listing (e.g., searchable terms).

In an embodiment, identical product listings are identified and de-duplicated (220). In one embodiment, the product listings are de-duplicated based on an analysis of the respective product identifiers (222). In one implementation, the product listings that have similar MPN are identified and analyzed to determine if either product listing has a variation or error in the characters that comprise the respective MPN of that product listing. As noted in FIG. 1, the analysis of the MPNs can include use of an MPN template (e.g., PID template 111) or set of MPN rules (e.g., product ID rules 109). The following provide examples of how MPNs can be analyzed and de-duplicated.

MPNs can be expressed as a string of characters. Two MPNs may have substantially the same characters, with variation in one character. For example, the variation can exist as a result of a special character. As an example:

MPN#1: A4563B#ABA MPN#2: A4563B-ABA

Additionally, a rule may be constructed to flag instances when two MPNs share similar character string, but differ by one character (or by one special character). The rule may assume the MPN was misspelled, or was a result of manual entry substitutions, such as typical with characters such as 0-O, 1-I-1, etc. As an example:

WED00345 and WEDOOO345.

On occasion, some products are created with the wrong MPN. A MPN template can be utilized to detect when the MPN of the product is incorrect. As an example:

7016A001AA and 74016A001AA.

Some products are created using abridged MPNs without localization code. Their specs might be the same as for the MPN with a full MPN. e.g. A4563B#ABA and A4563B.

For certain manufacturers and product sources, there may be multiple MPN formats, due to mergers or other events. As an example:

5734A005 and C83-1003.

There are other instances when product identifiers should be identical, but are not stored as such. For example, a product catalog may include a product listing with an alternative form of the product identifier, or incorporate the model number into the MPN.

In an implementation, the analysis module 120 can use a combination of rules and/or templates to identify the various instances of duplication amongst product listings in the product catalog. The analysis module 120 can link such listings so as to select a representative (or master) product listing (e.g., most recent product listing). In another implementation, a list or product listings can be generated and provided to an editor of the product catalog for review and deletion. Alternatively, the analysis component 120 can scan and remove the product listings from the product catalog 130 automatically (e.g., create a delete folder for suspect duplicate product listings).

As an addition or alternative, one or more embodiments provide for the product listings to be scanned and analyzed to determine groups of products (230) that are logically duplicative of one another. More specifically, a group of product listings can be identified that have different product identifiers (e.g., different MPN's), but nevertheless are for the same, or substantially the same product (or at least to the perception of the user, are for the same product). The groups amongst the product listings 131 can be identified by, for example, analyzing the content of the individual product listings to determine when the content is identical or substantially similar. Product listings may be deemed the same or substantially similar if content provided with the product listings describes products that have the same key characteristics for a particular category of the product. For example, a product line may include products that are distinct from one another on the basis of characteristics such as memory size, wireless communication capabilities and/or color. Within such product line, two product listings may be deemed logically duplicative if they share the same set of key characteristics. The product listings may also be deemed logically duplicative if the corresponding two products are about the same price.

As an addition or variation, some embodiments provide that content (e.g., marketing material) provided with each product listing can be analyzed to determine when two product listings are the same or substantially similar (232). The content that is analyzed can include text content, such as accompanying a technical specification or manufacturer's description of a product. Images, or metadata associated with the product listings can also be analyzed.

According to embodiments, the grouped product listings can be represented by one product listing for presentation. Alternatively, the group of product listings can be consolidated or combined. A consolidated entry can utilize one product identifier. The consolidated entry can also incorporate content from multiple items of content in each product listing. For example, if the content provided with two product listings is similar, the most recent content can be selected for the consolidated entry. For example, in a group of product listings, the consolidated entry may include the most recent image or set of images from either of the product listings.

In some variations, the type of analysis that is performed on the product listings include programmatic comparative analysis as between that content or metadata of the product listings. The analysis can be based on a predetermined threshold for deeming that the product listings are logically identical, or whether products described in product listings should be considered identical.

As an addition or alternative to de-duplicating product listings, product listings can be clustered (240). Clustering the product listings can enable the product listings to be combined or consolidated for presentation. A product line may include multiple products from a common manufacturer that are distinct from one another based on key characteristics. In the realm of consumer electronics, for example, product characteristics of different categories can include refurbished versus new, color, case material, and box items or package. Some product category specific characteristics include storage capacity (e.g., for laptops, tablets, mobile devices, computers, etc.), or carrier (for mobile devices or devices that are capable of roaming).

Still further, some products may have special editions. Other product categories can have characteristics that are specific to the product category. For example in the context of televisions, a product category can be specified by a brand and product name. However, the product category can include several products that distinguished by characteristics such as dimensions, and/or ancillary features (e.g., 3-D or not). Thus, a product line can have different products that are distinguished by characteristics that are specific to the product category.

According to some embodiments, a determination is made as to which characteristics of a product line (or similar products that share brand or manufacturing source or other significant similarity) delineate the products from one another to consumers (242). The determination can be made by statistically or quantitatively analyzing the product listings for a group of products (e.g., product line or products from a manufacturer or under a common brand). In one implementation, the product listings for the group of products are accumulated by characteristics. The number of product listings that are distributed by characteristics can be analyzed to determine statistical clusters. As an addition or alternative, the product listings can be aggregated based on price. The aggregation can identify which characteristics or set of characteristics are associated with specific price points, and which characteristics result in increments in the price of the product.

The identified cluster of products can be processed to enable page generation for the product cluster (244). As described with an example of FIG. 3, text and image content can be selected from product listings that comprise the cluster. As another variation, some text or image content can be generated or modified to be representative of the cluster. The product cluster can be associated with a master product listing, and with a web page. In this way, when clustered, the product listings provided with, for example, a portion of a web page can be selected based on products that share specific key characteristics.

In FIG. 3, product clusters are determined for product listings of a particular type or source (310). The products listings from which the clusters are determined can correspond to, for example, products of a product line, provided by particular manufacturer or source. In variations, very similar products from different manufacturers can also be analyzed for product clusters. For example, some products can originate from different manufacturers, but include a common brand name. Still further, products that share key components, such as operating systems or platform, can be clustered together.

According to some embodiments, the product listings are analyzed to determine clusters of product listings based on key characteristics. In one implementation, a statistical or quantitative analysis is used to identify the number of product listings that map to specific characteristics or sets of characteristics (312). An identification of clusters can be based on clusters of product listings that map to specific characteristics or sets of characteristics. The product listings may share many common key characteristics, and differ with respect to other characteristics.

The set of key characteristics can be those that distinguish one product from another product within a same category. For example, with tablets, such characteristics can include the memory size, the color, and a wireless communication capabilities of the tablet device. With televisions, for example, the characteristics can include whether the television includes 3-D capabilities, and/or the size of the television.

Once the product clusters are identified, content for each product cluster can be determined (320). The product content can include, for example, image content (322), product specification (324), and marketing text (326). Each type of content can be based on content selected from one of the product listings that comprise the cluster. The content element determined for the cluster of product listings may be representative of all product listings in the cluster.

In one implementation, one or more content elements are selected from the cluster of product elements (325). The selection may be based on criteria that indicates the content element is representative of the products identified by the cluster of product listings. For example, a representative image can be selected from the cluster of content elements. The representative image may apply to all images for the product cluster, or at least so a significant number of products identified in the product listings.

As an addition or alternative, some content elements can be generated, augmented to existing content, or otherwise modified to be representative for the cluster (327). For example, if a particular type of content is not representative of all products of the product cluster, one embodiment provides for the content to modified, augmented or generated in order for that content to represent the product clusters. For example, text content that is representative of features can be augmented to include additional text that describes variations of a particular characteristic amongst different product listings in the cluster. As another example, some key clusters are numeric (e.g., size of memory, performance speed), and the representative content can be augmented to include a range that includes the value for the characteristic for all products in the cluster. Still further, the image content can be modified or selected to represent the products of the product cluster.

The product listings can be made available for presentation as clusters (330). For a particular retailer, for example, a presentation can consolidate the viewership for the products listings that comprise the cluster. For online retailers, this enhances the ability for the retailer to market the product category as a whole.

EXAMPLES

FIG. 4A and FIG. 4B illustrate examples of presentations that depict product content based on determined clusters of product listings, according to one or more embodiments. The presentations depicted in FIG. 4A and FIG. 4B can be outputted by, for example, a system such as described with FIG. 1, or other embodiments provided herein. A presentation 410 can correspond to, for example, a web page that displays the product title for the cluster. The product cluster 418 may provide for a product that has several different key characteristics. For example, with reference to FIG. 4A, the key characteristics for a particular brand of mobile computing device can include color, memory size, and carrier. Product listings may be clustered within the product category based on the product listings providing for a common set of key characteristics. Each cluster of product listings can be represented by one or more elements (e.g., image, price listing) from one of the product listings in the cluster. For example, in FIG. 4A, a cluster of product listings can defined for White iPhones With 16 GB Memory for a specific carrier. The elements that are depicted as being representative of the particular cluster can correspond to, for example, the most recently updated element. For example, the price listed for a particular cluster can be the lowest and/or most recent price for a product as compared to other product listings in the cluster.

FIG. 4B illustrates a variation to product content that is generated from multiple product listings of a particular product category. A product page 420 is generated based on the product title of a cluster of product listings that share a set of key characteristics. The product page 420 depicts an image 434 that is selected from one of the product lists in the cluster, and deemed to be representative of the other product listings in the cluster.

In one embodiment, the selected portions of the generated product page include text description 432 (e.g., unstructured description), images 434, ratings 436 (e.g., user or editor) and links 438 to clusters 444 of product listings that are share a set of key characteristics 442a (e.g., memory), 442b (e.g., carrier), and (e.g., color) 442c. In this way, the product content 430 can be assimilated using elements provided by individual product listings of the product category. For example, once the clusters are identified, the elements of the product content 420 corresponding to the text 432 or images 434 can be selected from one of the product listings in the product category, based on criteria such as recency. The ratings 436 can be aggregated or averaged (weighted or otherwise) from multiple product listings. The clusters 444 can be presented as selectable links, which can be activated to display links to individual product listings that comprise the cluster 444.

In displaying the select image 434, a determination can be made as to whether any of the images for some or all of the product listings can be inherited by other product listings in the cluster. For example, for a product that includes offerings in multiple colors, an image that depicts the product in only one of the colors can be deemed to not be inheritable to other product listings in the cluster, particularly those product listings which provide the product in an alternative color. When the images of the cluster of product listings can be shared by other products in the product listings, then the image can be selected for display on the product page 420 as being representative of other product listings in the cluster.

Similarly, the text and product features for individual product listings in the family can be analyzed to determine whether the text can be incorporated as representative text on the product page. For example, programmatic analysis may be performed to identify whether a portion of the marketing text for a particular product listing is applicable to all products of the cluster of product listings, or to just some of the products in the product listing. In absence of identifying text that is applicable to all of the product cluster, manual input may be used to generate marketing text for the product page 420, so that the product page 420 can be applicable to all of the product listings in the cluster.

When displaying a product page with a representative image and text, embodiments recognize that it would also be beneficial to include technical product specification on the product page. Specifications often recite attributes and ranges thereof which are not necessarily shared by all products in the cluster. One or more embodiments provide for generating a consolidated or combined technical specification which expresses differences in attributes or characteristics in ranges or alternatives. For example, the memory size of a product cluster can be expressed as 16 GB, 32 GB or 64 GB.

Thus, according to one or more embodiments, the product listings for the cluster are analyzed to identify key characteristics of the products. Those characteristics which are shared by the various product listings can be identified. The image, technical specification and marketing text that are associated with the shared key characteristics can be selected based on, for example, a single master product listing which is most recent. For those key characteristics which differ amongst products in the cluster, the images, technical specification and marketing material provided on the product page 420 can be (i) selected based on criteria (e.g., describe or depict key characteristic (e.g., color) that is most popular), (ii) edited to reflect variations, and/or (iii) combined. For example, the technical specification and marketing material for a product with different memory variations can be amended (based on a master product listing for the cluster) from "16 GB" to "16 GB, 32 GB or 64 GB," "16 GB to 64 GB models" or variations thereof.

Computer System

Figure 5:
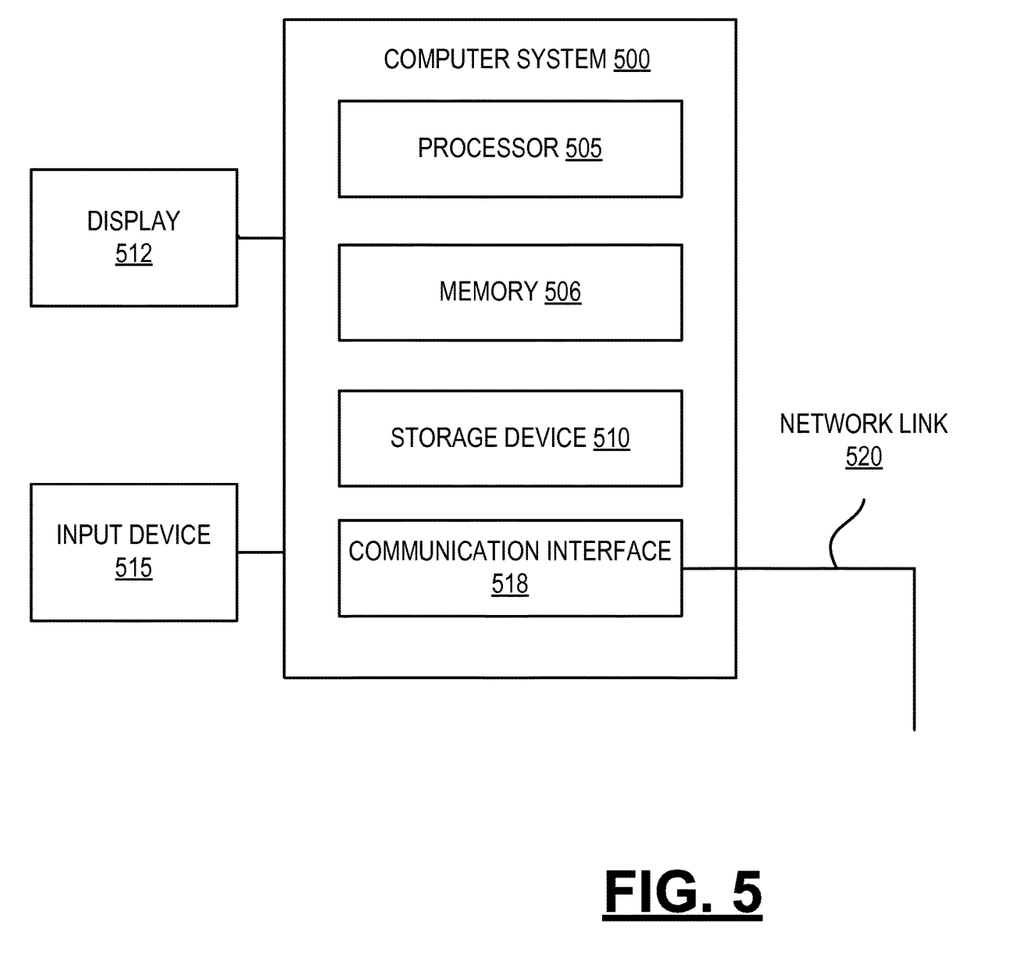
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, system 100 may be implemented using one or more computer systems such as described by FIG. 5.

In an embodiment, computer system 500 includes processor 505, memory 506 (including non-transitory memory), storage device 510, and communication interface 518. Computer system 500 includes at least one processor 505 for processing information. Computer system 500 also includes a main memory 506, such as a random access memory (RAM) or other dynamic storage device, for storing information and instructions to be executed by processor 505. Main memory 506 also may be used for storing temporary variables or other intermediate information during execution of instructions to be executed by processor 505. Computer system 500 may also include a read only memory (ROM) or other static storage device for storing static information and instructions for processor 505. A storage device 510, such as a magnetic disk or optical disk, is provided for storing information and instructions. The communication interface 518 may enable the computer system 500 to communicate with one or more networks through use of the network link 520 (wireless or wireline).

Computer system 500 can include display 512, such as a cathode ray tube (CRT), a LCD monitor, and a television set, for displaying information to a user. An input device 515, including alphanumeric and other keys, is coupled to computer system 500 for communicating information and command selections to processor 505. Other non-limiting, illustrative examples of input device 515 include a mouse, a trackball, or cursor direction keys for communicating direction information and command selections to processor 505 and for controlling cursor movement on display 512. While only one input device 515 is depicted in FIG. 5, embodiments may include any number of input devices 515 coupled to computer system 500.

Embodiments described herein are related to the use of computer system 500 for implementing the techniques described herein. According to one embodiment, those techniques are performed by computer system 500 in response to processor 505 executing one or more sequences of one or more instructions contained in main memory 506. Such instructions may be read into main memory 506 from another machine-readable medium, such as storage device 510. Execution of the sequences of instructions contained in main memory 506 causes processor 505 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for managing a product catalog, the method being implemented by one or more processors and comprising:

receiving, over a computer network, two or more product records from a remote product catalog database, each product record corresponding to a product and including at least one unique product identifier;

determining that a first set of two or more of the product records are for an identical product, and that a discrepancy between each of the product identifiers of the first set of two or more product records is immaterial;

determining that a second set of two or more product records each identify a product that has a common manufacturer and product name, but which differ from one another based on a set of one or more key characteristics; and transmitting information to the remote product database indicating that the two or more product records correspond to an identical product, whereby the product database is enhanced to remove at least one of the two or more product records.

2. The method of claim 1, wherein determining that a first set of two or more product records are for an identical product includes determining that the product identifiers for each of the two or more product records of the first set are different, but should be the same.

3. The method of claim 2, wherein the product identifiers for each of the two or more product records of the first set are different as a result of a discrepancy in only one or two characters that comprise the product identifier of one or more of the product listings of the first set.

4. The method of claim 2, wherein the product identifiers for each of the two or more product records of the first set are different as a result of a discrepancy in only a subset of characters that comprise the product identifier of one or more of the product records of the first set.

5. The method of claim 2, wherein the product identifiers for each of the two or more product records of the first set are different as a result of an omitted or incorrect character.

6. The method of claim 2, wherein determining that a first set of two or more product records in the product catalog are for an identical product detecting one or more product records of the first set based on a product identifier template for a particular source.

7. The method of claim 1, further comprising determining a cluster of product records, the cluster of product records including multiple product listings for a set of products, each product in the set of products sharing a set of product characteristics and a product source, but being distinguishable from other products in the set based on a variation of at least one product characteristic.

8. The method of claim 7, further comprising using multiple product records from the cluster of product records on a single presentation in response to a request for a product or product listing of the cluster.

9. The method of claim 8, wherein using multiple product records includes providing a portion of the product description of each product record on a webpage for the products of the product listings of the cluster.

10. The method of claim 1, wherein the product identifier of the collection of product records corresponds to a manufacturer part number (MPN).

11. The method of claim 1, wherein the product identifier of the collection of product listings corresponds to a Universal Product Code ("UPC"), International Standard Book Number ("ISBN"), European Article Number ("EAN") or Japanese Article Number ("JAN").

* * * * *